US011398971B1

(12) United States Patent
Adiga H R et al.

(10) Patent No.: US 11,398,971 B1
(45) Date of Patent: Jul. 26, 2022

(54) SYSTEM AND METHOD FOR DYNAMIC TUNING OF NEIGHBOR AGING

(71) Applicant: Hewlett Packard Enterprise Development LP, Houston, TX (US)

(72) Inventors: Badrish Adiga H R, Bengaluru (IN); Venkatesh Natarajan, Bengaluru (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 18 days.

(21) Appl. No.: 17/147,019

(22) Filed: Jan. 12, 2021

(51) Int. Cl.
| H04L 12/28 | (2006.01) |
| H04L 45/02 | (2022.01) |
| H04L 101/622 | (2022.01) |
| H04L 61/103 | (2022.01) |
| H04L 12/46 | (2006.01) |
| H04L 45/74 | (2022.01) |
| H04L 61/5014 | (2022.01) |
| H04L 45/00 | (2022.01) |

(52) U.S. Cl.
CPC .......... *H04L 45/02* (2013.01); *H04L 12/4633* (2013.01); *H04L 45/66* (2013.01); *H04L 45/74* (2013.01); *H04L 61/103* (2013.01); *H04L 61/2015* (2013.01); *H04L 61/6022* (2013.01)

(58) Field of Classification Search
CPC .............................. H04L 45/02; H04L 61/103
USPC .......................................................... 370/392
See application file for complete search history.

(56) References Cited

U.S. PATENT DOCUMENTS

| 11,212,279 B1* | 12/2021 | Levy-Abegnoli ........................... H04L 63/0876 |
| 11,277,442 B2* | 3/2022 | Sheth .................... H04L 63/126 |
| 2016/0380882 A1* | 12/2016 | Thomas .............. H04L 61/6059 370/401 |
| 2020/0204517 A1* | 6/2020 | Daun .................. H04L 61/6022 |
| 2020/0322224 A1* | 10/2020 | Sheth .................... H04W 84/18 |

FOREIGN PATENT DOCUMENTS

| CN | 102158395 A | * | 8/2011 | ............. H04L 45/02 |
| EP | 3110086 A1 | * | 12/2016 | ............. H04L 45/20 |
| WO | WO-2012109841 A1 | * | 8/2012 | ......... H04L 41/0672 |

* cited by examiner

*Primary Examiner* — Hee Soo Kim
(74) *Attorney, Agent, or Firm* — Park, Vaughan, Fleming & Dowler LLP

(57) ABSTRACT

One embodiment provides a system and method for managing, at a network node, a data structure indicating neighbor node address information. During operation, the system can determine, based on a media access control (MAC) address or an Internet protocol (IP) address associated with an entry in the data structure, a type of the entry, and set a timeout value for the entry based on the determined type. In response to detecting that an entry corresponding to the MAC address expires in a MAC table maintained by the network node, the system can identify an interface on the network node to which a neighbor associated with the MAC address was previously coupled and transmit a unicast neighbor-probe packet on the identified interface to determine a connection status of the neighbor.

20 Claims, 6 Drawing Sheets

| NEIGHBOR ENTRY TYPE | IP ADDRESS | MAC ADDRESS | NEIGHBOR TIMEOUT (MIN) | CURRENT AGE (MIN) | FLAG |
|---|---|---|---|---|---|
| SECURE-HOST | 10.0.0.1 | 44.38.39.00.00.01 | INF | 100 | V |
| SECURE-HOST | 20.0.0.2 | 40.38.39.00.00.0b | INF | 120 | V |
| DHCP-CLIENT | 20.0.0.50 | 34.18.29.00.00.0a | 180 | 32 | V |
| DHCP-CLIENT | 11.0.0.07 | 10.28.29.00.00.10 | 240 | 53 | V |
| DYNAMIC-HOST | 30.0.0.10 | 44.38.39.00.00.01 | 30 | 13 | V |
| ... | | | | | |
| DYNAMIC-HOST | 11.0.0.1 | 44.38.39.00.00.01 | 30 | 30 | — |

SYSTEM AND METHOD FOR DYNAMIC TUNING OF NEIGHBOR AGING

BACKGROUND

Field

This disclosure is generally related to the control operations of Internet protocol (IP) neighbor cache expirations in a network deployment with a large number of neighbors. Additionally, this disclosure is related to managing neighbor cache entries at virtual tunnel end points (VTEPs) in Virtual Extensible Local Area Networks (VxLANs).

BRIEF DESCRIPTION OF THE FIGURES

FIG. 1 illustrates a neighbor table on a switch, according to one embodiment.

In the figures, like reference numerals refer to the same figure elements.

DETAILED DESCRIPTION

Figure 2:
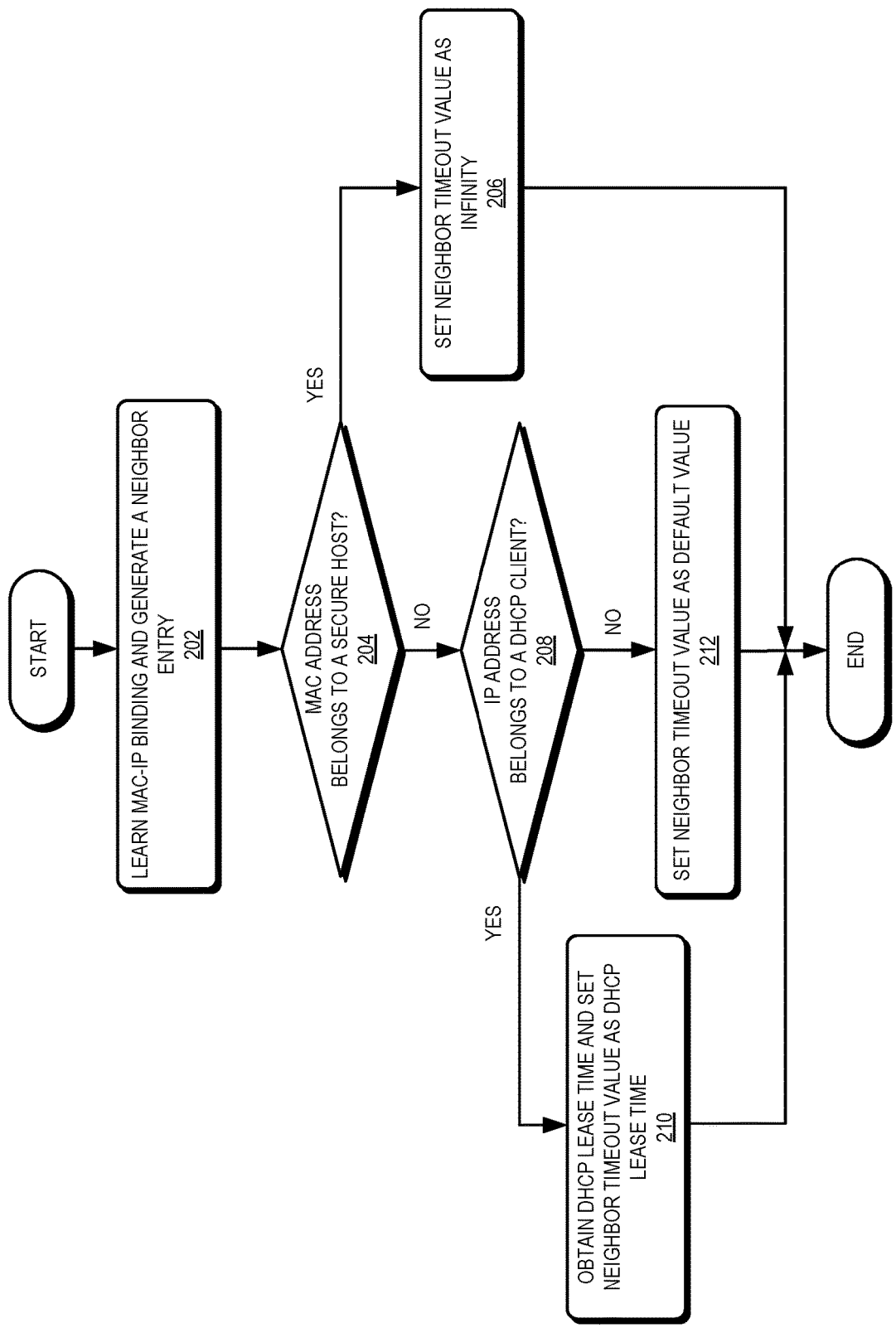
FIG. 2 presents a flowchart illustrating an exemplary process for setting neighbor timeout values, according to one embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the scope of the present disclosure is not limited to the embodiments shown, but is to be accorded the widest scope consistent with the principles and features disclosed herein.

Recently VxLAN has been widely deployed in many layer 3 (L3) data centers to provide layer 2 (L2) connectivity between hosts. Ethernet Virtual Private Network (EVPN) provides a scalable, interoperable end-to-end control-plane solution for VxLAN using Border Gateway Protocol (BGP). EVPN defines a way for a VTEP to discover other VTEPs in the network and the connected hosts in the underlay network.

The two main deployment architectures in VxLAN are centralized and distributed. In the centralized architecture, all but a few of the VTEPs behave as L2-VTEPs and do not act as a gateway for the overlay hosts. All routings between the L2 segments happen on a centralized VTEP. The typical characteristic of this architecture is that the inter L2 segment traffic trombones via the centralized gateways. In the distributed architecture, each VTEP acts as the default gateway for the overlay hosts connected to the VxLAN subnets. Because the distributed architecture provides the VxLAN routing closest to the hosts on the directly connected leaf switches, the traffic flow is simplified. In a large network (either EVPN-based or conventional networks) having a large number of neighbors, frequent expiration of IP neighbor cache entries can cause lots of problems and even be destructive.

The disclosed embodiments provide solutions to the technical problem of frequent eviction of expired IP neighbor cache entries on network nodes generating excessive traffic in the network. Note that a switch can use the address resolution protocol (ARP) to map an IP version 4 (IPv4) address to a physical or a media access control (MAC) address of a host. Similarly, a switch can use the neighbor discovery protocol (NDP) to map an IP version 6 (IPv6) to a physical or MAC address of a host. The IP-MAC address mapping can be stored in a table, such as an ARP cache (in the case of IPv4) or a neighbor-discovery (ND) cache (in the case of IPv6). The ND cache in IPv6 can be nearly identical in contents and format to the ARP cache in IPv4. For simplicity, this disclosure uses the unified term "neighbor cache/table" to represent both the ARP cache/table and the ND cache/table. Entries in the neighbor cache or table are referred to as neighbor entries. For IPv4, the entries are in fact ARP entries; for IPv4, the entries are in fact ND entries. Also noted that, although the examples shown in this disclosure use a table to store address information (e.g., MAC and IP addresses) associated with neighbor nodes, in practice, a switch or router can use any type of data structure to store such address information. The scope of this disclosure is not limited by the format or type of the data structure used to store neighbor address information.

To reduce the frequency of neighbor entry aging-out, the disclosed hardware system handles different types of neighbor entries differently, such as by setting different timeout values for different types of neighbor entries. The timeout value of entries associated with secure hosts can be set as infinity (these entries do not age out but will be deleted when the corresponding MAC entries are de-authenticated). The timeout value of entries associated with dynamic host configuration protocol (DHCP) clients can be set based on the corresponding DHCP lease time. On the other hand, the timeout value of remaining entries can be set according to a default value, which is often a value recommended by the switch manufacturer.

In a large, complex network (traditional or EVPN-based), frequent expiration of neighbor entries can be problematic. More specifically, when a neighbor entry ages out from the neighbor cache at a switch, the switch needs to send a probe (in the form of a packet) to check whether the host associated with the expired entry is still present in the network. If the host is still active, it replies to the probe, and the switch refreshes its neighbor entry. If no response is received after a number of probing attempts (e.g., three probes by default), the switch determines that the neighbor is no longer present in the network, and the corresponding neighbor entry is deleted. In the scenario of frequent neighbor expiration, a large number of probes for the expired neighbors will be needed. Transmitting these probes and receiving and handling responses consumes large amounts of CPU resources at the switch (or router) and a considerable amount of bandwidth in the network.

EVPN uses BGP routing to allow VTEPs to exchange BGP-EVPN routes to implement automatic VTEP discovery and host information advertisement, preventing unnecessary traffic flooding. BGP supports integrated routing and bridging (IRB), which enables end hosts across the overlay to communicate with each other within or across the subnets in the VPN. Based on the tunneling methods used, there are two IRB solutions, the symmetric IRB and the asymmetric IRB. In a network implementing BGP-EVPN, the problem associated with frequent MAC aging-out of neighbor entries can be more severe, because the neighbor-probe packets are broadcast in nature and are required to be ingress replicated at all peer VTEPs (i.e., VTEPs hosting the same VLAN). To mitigate the negative impact of the large number of probes in the EVPN deployment, in some embodiments, when a neighbor entry expires due to a MAC age-out event, instead of broadcasting the neighbor probes, the system can transmit an initial unicast probe packet to the host associated with the expired MAC address. Subsequent broadcast probes can be sent if no response to the initial unicast probe is received.

In some embodiments, to reduce the frequency of neighbor aging-out, the expiration of different types of neighbor entries can be configured differently at the switch. More specifically, when storing a neighbor entry in the neighbor table, the neighbor-table logic on the switch can configure the timeout timer of the neighbor entry based on the particular type of the neighbor entry, which is determined based on the corresponding media access control (MAC) address or the Internet protocol (IP) address associated with the neighbor entry. Note that the term "logic" used here can refer to a processing resource capable of executing specific actions and/or functions. A logic can include hardware (e.g., various forms of transistor logic, application-specific integrated circuits (ASICs), field-programmable gate arrays (FPGAs), etc.) as opposed to computer-executable instructions (e.g., software, firmware, etc.) stored in memory and executable by a processor.

In campus networks, security policies can be dynamically assigned to a wired port based on the access method of a client. A switch can enforce the security policies for the client using various mechanisms, including using a Remote Authentication Dial-In User Service (RADIUS) server or a local MAC authentication in the switch. In such an environment, if a MAC address is authenticated by a port-access security feature, such as IEEE 802.1X security authentication or MAC-auth, the MAC address won't age out from the MAC table until the MAC address is de-authenticated. This authentication feature can also be used to facilitate the reduction of the neighbor aging-out frequency. More specifically, upon a successful address resolution (e.g., receiving an ARP or ND response), the MAC-IP address binding can be saved as an entry in the neighbor table or cache, which is typically managed by the switch ASIC. While storing the neighbor entry, the neighbor-table logic (which can be part of the switch ASIC) can determine if the MAC address specified by the neighbor entry has been successfully authenticated by a MAC-based authentication mechanism (e.g., 802.1X or MAC-auth). If so, the neighbor-table logic can mark the neighbor entry as a secure-host entry, and the neighbor timeout timer of the secure-host entry can be set to infinity. Note that setting the neighbor timeout timer to infinity does not mean that the neighbor entry will remain in the neighbor table forever. The MAC-based authentication is performed periodically (e.g., based on a timer), and previously authenticated MAC addresses can be de-authenticated. Once a previously authenticated MAC address is de-authenticated, the corresponding entry in the MAC table (which maps the MAC address of a virtual machine to a switch from which it is reachable) is deleted. In some embodiments, the MAC-table logic can be configured to send a signal to the neighbor-table logic, triggering the neighbor-table logic to delete the neighbor entry corresponding to the de-authenticated MAC address. This way, the neighbor-table logic does not need to track the expiration of the secure-host entries. Instead, the eviction of a secure-host entry from the neighbor table will depend on the MAC authentication outcome.

In addition to secure-host entries, the neighbor table can also include another type of special entry, the dynamic host configuration protocol (DHCP)-client entry. More specifically, when storing a neighbor entry, the neighbor-table logic in the switch ASIC can determine if the IP address specified by the neighbor entry is present in the DHCP-snooping database. If so, the entry can be marked as a DHCP-client entry. DHCP snooping is a security technique and the DHCP-snooping database stores information (e.g., client MAC addresses, DHCP-assigned IP addresses, remaining lease times, VLANs, switch ports, etc.) on hosts that have successfully completed a DHCP transaction. In some embodiments, information stored in the DHCP-snooping database can be used to set the timeout timers of DHCP-client entries in the neighbor table. More particularly, the DHCP lease time of a particular IP address can be used as the timeout value for a neighbor entry corresponding to the particular IP address. This way a DHCP-client entry can remain valid in the neighbor table as long as the DHCP lease is valid, thus reducing the aging-out frequency of the DHCP-client entries. In situations where the lease entry in the DHCP-snooping database is deleted before the end of the lease time, the DHCP-snooping database can be configured to send a signal to the neighbor-table logic, triggering the neighbor-table logic to delete the neighbor entry corresponding to the deleted lease entry. Hence, the deletion of a DHCP-client entry from the neighbor table is either determined by the DHCP lease time or by the DHCP-snooping database deleting the corresponding lease entry. When the DHCP lease is renewed (e.g., when a message is received from the DHCP-snooping database indicating the renewed lease), the timeout value of the corresponding neighbor entry can also be updated based on the renewed DHCP lease.

In another situation, a DHCP client may be disconnected before the expiration of its DHCP lease time. The disconnection can cause the deletion of a corresponding entry in the MAC table, which will in turn trigger a probe packet to be sent out to probe the connection status of the client. In response to receiving no reply for a number (e.g., three) of probes, the neighbor-table logic can delete the corresponding neighbor entry.

Other entries in the neighbor table can be marked as dynamic-host entries. In some embodiments, the neighbor-timeout timer of the dynamic hosts can be set according to a default value (e.g., 30 minutes, an hour, or any appropriate value determined by the switch vender). The default value can also be configurable by the network administrator.

FIG. 1 illustrates an exemplary neighbor table on a switch, according to one embodiment. In some embodiments, a neighbor table can include a data structure that indicates address information (e.g., IP address and MAC address) associated with a number of neighbor nodes. In the example shown in FIG. 1, the data structure is shown as a table having a number of entries. In practice, any data structure indicating neighbor node address information can be used. Neighbor table 100 can include a number of entries, such as entries 102, 104, and 106. Each entry can include a number of fields, such as neighbor entry type, IP address, MAC address, neighbor timeout, current age, and flag.

The entry type field can indicate whether the neighbor entry is a secure-host entry, a DHCP-client entry, or a dynamic-host entry. In the example shown in FIG. 1, entry 102 is a secure-host entry, meaning that the MAC address specified by entry 102 has been authenticated by a MAC-based port-authentication mechanism (e.g., the authentication method defined by IEEE standard 802.1X or MAC-auth); entry 104 is a DHCP-client entry, meaning that the IP address specified by entry 104 is present in the DHCP-snooping database; and entry 106 is a dynamic-host entry.

The IP address field can include an IPv4 or IPv6 address, and the MAC address field can include the hardware address corresponding to the address in the IP address field. The neighbor timeout field specifies the setting of the timeout timer for each particular entry or type of entry. For secure-host entries (e.g., entry 102), the timeout field can be assigned a value of infinity (INF), meaning that these neighbor entries will not aged out. However, they will be deleted when the corresponding MAC entries are de-authenticated. For DHCP-client entries (e.g., entry 104), the timeout field can be assigned a value corresponding to the lease time of the specified IP address. In FIG. 1, the DHCP lease time for IP address 11.0.0.07 is 4 hours (240 minutes), and the timeout value for entry 104 is accordingly set at 240 minutes. For dynamic-host entries (e.g., entry 106), the timeout field can be set according to the default neighbor timeout value (e.g., 30 minutes). The current age field indicates how long the entry has been placed in neighbor table 100. The flag field indicates whether an entry is valid (V) or invalid (I). It is possible that neighbor table 100 includes additional fields (e.g., the VLAN for each MAC-IP pair). The additional information does not affect the operation of the dynamic neighbor aging and will not be discussed here.

FIG. 2 presents a flowchart illustrating an exemplary process for setting neighbor timeout values, according to one embodiment. During application, a switch (e.g., a VTEP in an EVPN) learns a MAC-IP address binding and generates an entry in the neighbor table (operation 202). The MAC-IP binding can be learned by performing address resolution (e.g., according to ARP or NDP) at the switch can be received from peer switches in the network. The neighbor table can be implemented using hardware (e.g., a cache) or software (e.g., a memory managed by software). Entries in the neighbor table can be similar to the ones shown in FIG. 1.

The neighbor-table logic at the switch examines the MAC address in the MAC-IP binding to determine if the MAC address belongs to a secure host (operation 204). For example, if the host is authenticated by a port-access security measure, such as 802.1X and MAC-based authentication, the host can be marked a secure host. Typically, secure hosts do not age out in the MAC table. If the MAC address belongs to a secure host, the neighbor entry corresponding to the MAC-IP binding is considered a secure-host entry, and the neighbor-table logic sets the neighbor timeout value for that entry as infinity (operation 206). Note that setting the neighbor timeout value as infinity does not mean that the neighbor entry will be static or remain in the neighbor table forever. In fact, when the host is de-authenticated, the MAC-table logic deletes the corresponding MAC entry. In some embodiments, the MAC-table logic can be configured to send a control signal to the neighbor-table logic, triggering the neighbor-table logic to remove the corresponding neighbor entry, even through the timeout value of the neighbor entry is infinity.

If the MAC address does not belong to a secure host, the neighbor-table logic examines the IP address in the MAC-IP binding to determine if the IP address belongs to a DHCP client (operation 208). More specifically, the logic can check the DHCP-snooping database to determine if the IP address is present in the DHCP-snooping database, which typically stores information extracted from intercepted DHCP messages. For example, an entry in the DHCP-snooping database can include information extracted from a DHCP message, such as the MAC address of an untrusted host, a leased IP address, the lease time, etc. If the IP address belongs to a DHCP client, the neighbor entry corresponding to the MAC-IP binding can be considered as a DHCP-client entry, and the neighbor-table logic can further obtain the lease time for the IP address from the DHCP-snooping database and set the neighbor timeout value for such entry as the DHCP lease time (operation 210). Note that, even though the neighbor entry has a timeout time set as the DHCP lease time, in the event that the entry corresponding to the IP address is removed from the DHCP-snooping database, the DHCP-snooping database can send a control signal to the neighbor-table logic, triggering the neighbor-table logic to remove the corresponding neighbor entry, even through the neighbor entry is not yet aged out. In one scenario, a client may be disconnected before the expiration of its DHCP lease time, causing the corresponding MAC entry in the MAC table to age out. The MAC age-out will trigger the transmission of a probe packet. In response to receiving no reply after a predetermined number (e.g., three) of probe attempts, the neighbor-table logic can delete the corresponding neighbor entry.

If the MAC address of the host associated with the MAC-IP binding does not belong to a secure host and the IP address does belong to a DHCP client, the host can be marked as a dynamic host, and neighbor-table logic can treat the corresponding neighbor entry as a dynamic-host entry and set its neighbor timeout value as the default value (e.g., 30 minutes or an hour) (operation 212).

Once the timeout values of entries in the neighbor table on the switch are set, the neighbor entries can be evicted either due to the occurrence of the timeout (i.e., its current age reaches the timeout value) or due to receipt of a control signal from other logics on the switch (e.g., the MAC-table logic or the DHCP-snooping logic). As discussed previously, a secure-host entry can be evicted from the neighbor table in response to the MAC address of the secure host being deleted from the MAC table on the switch. Similarly, a DHCP-client entry can be evicted from the neighbor table, in response to the IP address of the DHCP client being removed from the DHCP-snooping database.

Modifying the neighbor timeout values of the secure-host entries and the DHCP-client entries can prevent these neighbor entries from being aged out of the neighbor table prematurely, thus significantly reducing the frequency of the neighbor entry aging-out.

Figure 3:
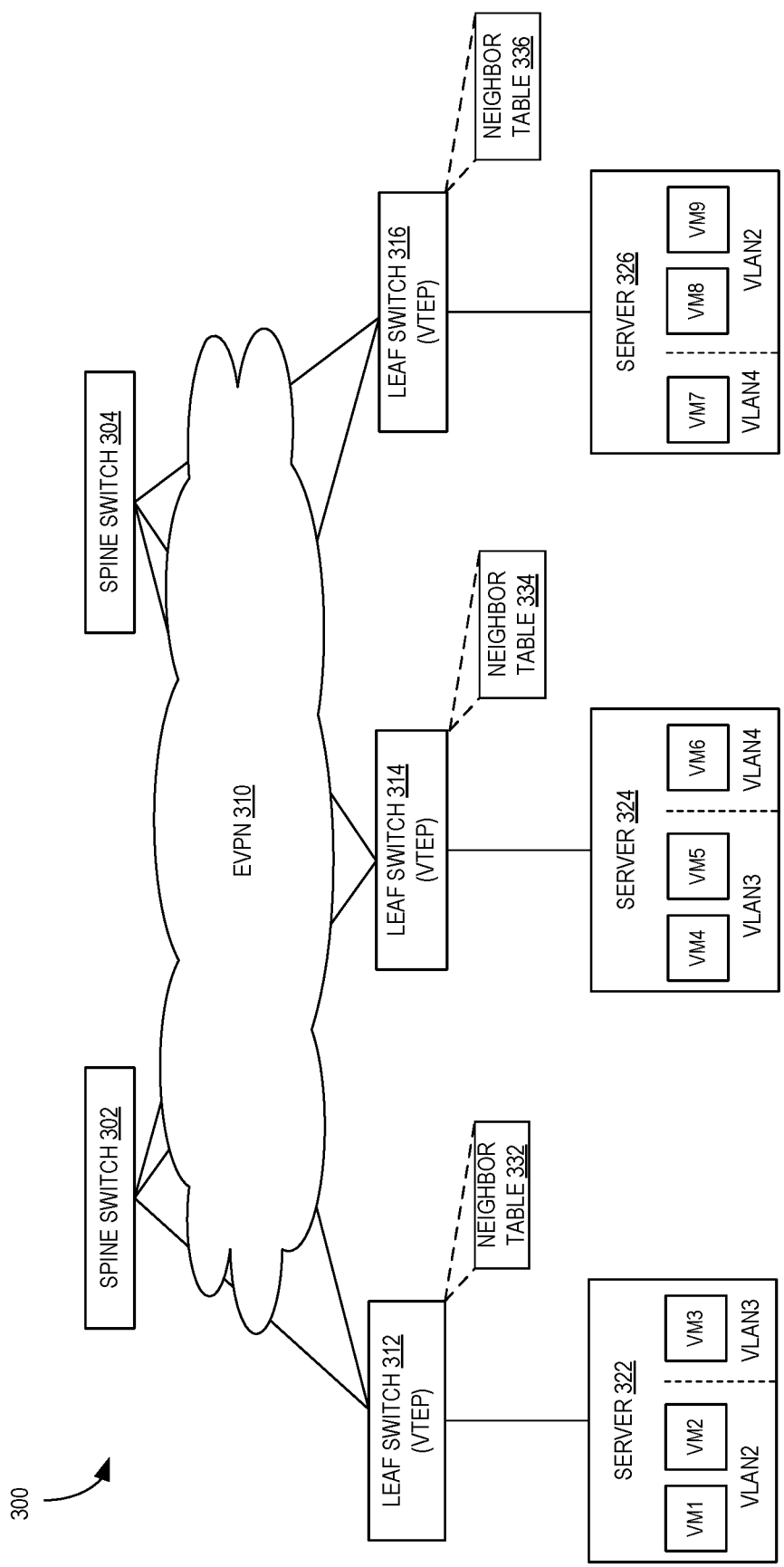
FIG. 3 illustrates an exemplary environment for implementing the dynamic tuning of neighbor aging, according to one embodiment.

FIG. 3 illustrates an exemplary environment for implementing the dynamic tuning of the neighbor aging, according to one embodiment. In FIG. 3, network 300 can have a spine-leaf topology and include a number of interconnected switches, such as spine switches 302 and 304, and leaf switches 312, 314, and 316. More specifically, the switches can be coupled to each other via an EVPN 310, with each leaf switch being a VTEP capable of discovering other VTEPs (switches) in network 300.

Each VTEP can be connected to a number of hosts. In FIG. 3, each VTEP is connected to a server, which runs a plurality (e.g., three) of virtual machines (VMs). For example, VTEP 312 is connected to server 322, which runs a number of VMs (e.g., VM1, VM2, and VM3). Similarly, VTEP 314 is connected to server 324, and VTEP 316 is connected to server 326. Each VTEP can configure multiple VLANs, and the VMs running on a server can belong to different VLANs. In the example shown in FIG. 3, each VTEP can have all the VLANs (i.e., VLAN2, VLAN3, and VLAN4) configured. VM1, VM2, VM8, and VM9 belong to VLAN2; VM3-VM5 belong to VLAN3; VM6 and VM7 belong to VLAN4.

Each VTEP maintains a neighbor table, which can be used to determine a mapping between an IP address and a MAC address. In FIG. 3, VTEP 312 maintains neighbor table 332, VTEP 314 maintains neighbor table 334, and VTEP 316 maintains neighbor table 336. When VM1 (which belongs to VLAN2) attempts to send packets to VM5 (which belongs to VLAN3), the packets will be routed to VLAN3 at VTEP 312, which checks neighbor table 332 to determine if a matching entry can be found. If not, VTEP 312 can perform address resolution to obtain the corresponding MAC address of VM5 and generate an entry in neighbor table 332 based on the result of the address resolution.

Compared with traditional networks, in the EVPN-VxLAN deployment shown in FIG. 3, frequent expiration of neighbor entries can be extra troublesome. As discussed previously, if there is a silent host, and if the MAC entry corresponding to such a host ages out, a probe packet will be sent to check if the host is still active. In conventional approaches, this neighbor-probe packet is broadcast in nature, meaning that it will be ingress replicated at all the VTEPs hosting the same VLAN. In the example shown in FIG. 3, there is a local neighbor entry for VM1 at VTEP 312. When the MAC entry for VM1 at VLAN2 ages out, the corresponding MAC entry is deleted from the MAC table at VTEP 312. In this case, to refresh the neighbor entry, VTEP 312 needs to transmit a broadcast neighbor-probe packet, which is always ingress replicated to all the VTEPs hosting VLAN2 (i.e., VTEPs 312 and 316).

In some embodiments, to reduce the amount of traffic caused by neighbor probing, a switch may be configured to send out neighbor probes adaptively. In other words, instead of broadcasting all probes, the switch may transmit an initial probe in a unicast manner to the particular neighbor requiring probing. Broadcast probe packets are sent only after no reply is received for the unicast probe packet. The number of total probes can be configurable.

In the above example, the timeout value of the MAC entry of VM1 can be set as 300 seconds, while the timeout value of the neighbor entry of VM1 can be set as 1200 seconds. The default number of neighbor probes can be set as three. After 300 seconds, if the MAC entry of VM1 ages out, VTEP 312 can be configured to first identify an interface (e.g., a switch port) to which VM1 was previously connected, and then send a unicast probe to the IP address of VM1 on the identified interface in order to probe the connection status of VM1.

If VM1 remains connected to VTEP 312, it receives the probe and sends a reply to VTEP 312. In response, VTEP 312 refreshes both the MAC entry and the neighbor entry corresponding to VM1. There is no longer the need to send out additional probes. Moreover, because the probe is a unicast message, ingress replication at peer VTEPs is not needed.

If VM1 migrates to a different interface, it will not receive the initial unicast probe. Consequently, VTEP 312 will not receive any response to the initial unicast probe. In response, VTEP 312 sends, after a predetermined interval, a subsequent neighbor-probe packet. This time, the probe packet is a broadcast packet and is ingress replicated to all the VTEPs hosting VLAN2 (i.e., VTEPs 312 and 316). Upon receiving the probe, VM1 sends a response to VTEP 312, which learns the IP-MAC binding of VM1 on the new interface and updates its neighbor entry accordingly.

On the other hand, if VM1 is disconnected, VTEP 312 will not receive any response to the second broadcast probe and will subsequently send, after a predetermined interval, a third neighbor-probe packet, which is also a broadcast packet. When VTEP 312 fails to receive a reply to the third neighbor-probe packet, VTEP 312 can delete the corresponding neighbor entry from its neighbor table. If the number of re-probe attempts is set to a number more than three, additional neighbor-probe packets can be sent.

Figure 4:
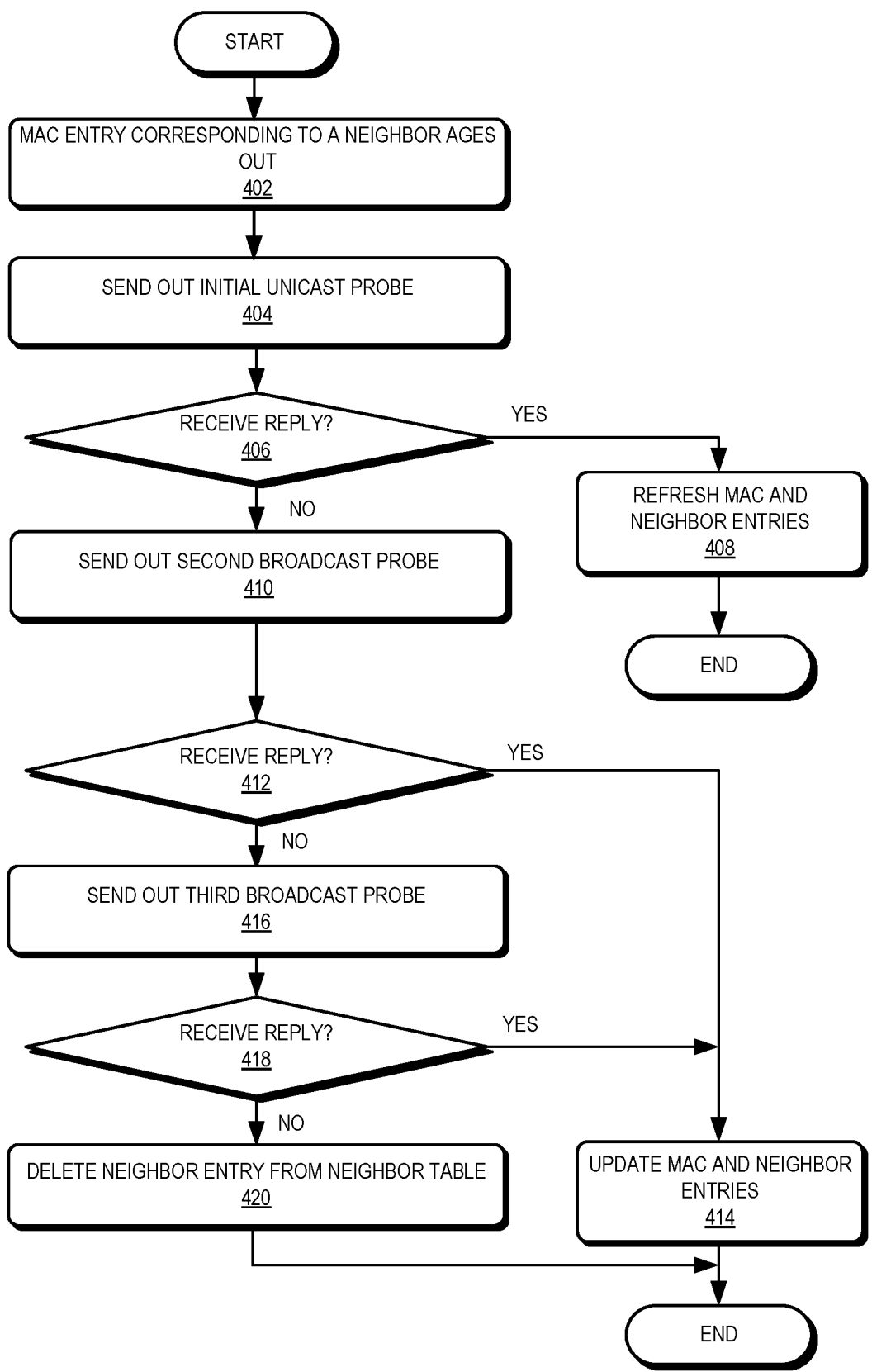
FIG. 4 presents a flowchart illustrating an exemplary process of neighbor probing, according to one embodiment.

FIG. 4 presents a flowchart illustrating an exemplary process of neighbor probing, according to one embodiment. During operation, a MAC entry in the MAC table maintained by a VTEP ages out (operation 402). In response, the VTEP sends out an initial unicast neighbor-probe packet to a neighbor corresponding to the MAC entry (operation 404) and determines if a response is received (operation 406). If so, the VTEP refreshes the MAC entry in the MAC table as well as the corresponding neighbor entry in the neighbor table (operation 408). If no response is received, the VTEP sends out a second probe, which is a broadcast packet (operation 410), and determines if a response is received (operation 412). If so, the VTEP updates the MAC entry as well as the corresponding neighbor entry based on the received response (operation 414). The received response may provide updated IP-MAC binding information. If no response is received, the VTEP sends out a third probe, which is also a broadcast packet (operation 416) and determines if a response is received (operation 418). If so, the VTEP updates the MAC entry as well as the corresponding neighbor entry (operation 414). Otherwise, the VTEP deletes the corresponding neighbor entry in the neighbor table maintained by the VTEP (operation 420).

In most situations, MAC entries age out before their corresponding neighbor entries age out, and the expired MAC entries may correspond to hosts that are still connected, but inactive. Therefore, sending the initial neighbor-probe packets to those connected hosts in a unicast way instead of broadcasting them can prevent excessive ingress replication of these neighbor-probe packets to other VTEPs hosting the same VLAN, thus leading to reduced consumption of the network resources. This feature can be configured at switches implementing EVPN.

In addition to using adaptive neighbor probing to mitigate the negative impact of neighbor aging, the neighbor tables on the VTEPs and the control logics of these neighbor tables can implement dynamic neighbor aging. In other words, entries in a neighbor table do not all have the default timeout values. Depending on the type of entries, some entries may have their timeout value set as infinity, and some entries may have their timeout value set according to their DHCP lease time.

Returning to FIG. 3, in one example, VM1 can be a host authenticated using a MAC-based authentication mechanism and can be marked as a secure host. Accordingly, an entry associated with VM1 in neighbor table 332 can be marked a secure-host entry with its timeout value set as infinity. Moreover, VTEP 312 can send BGP-EVPN route exchange messages to VTEPs 314 and 316, advertising the MAC-IP binding to other VTEPs in network 300.

In another example, the IP address of a VM (e.g., VM4) can be a DHCP host. After the address resolution, VTEP 314 determines that the IP address of VM4 is present in its DHCP-snooping database. Accordingly, a neighbor entry associated with VM4 can have its timeout value set as the DHCP lease time of the IP address.

Figure 5:
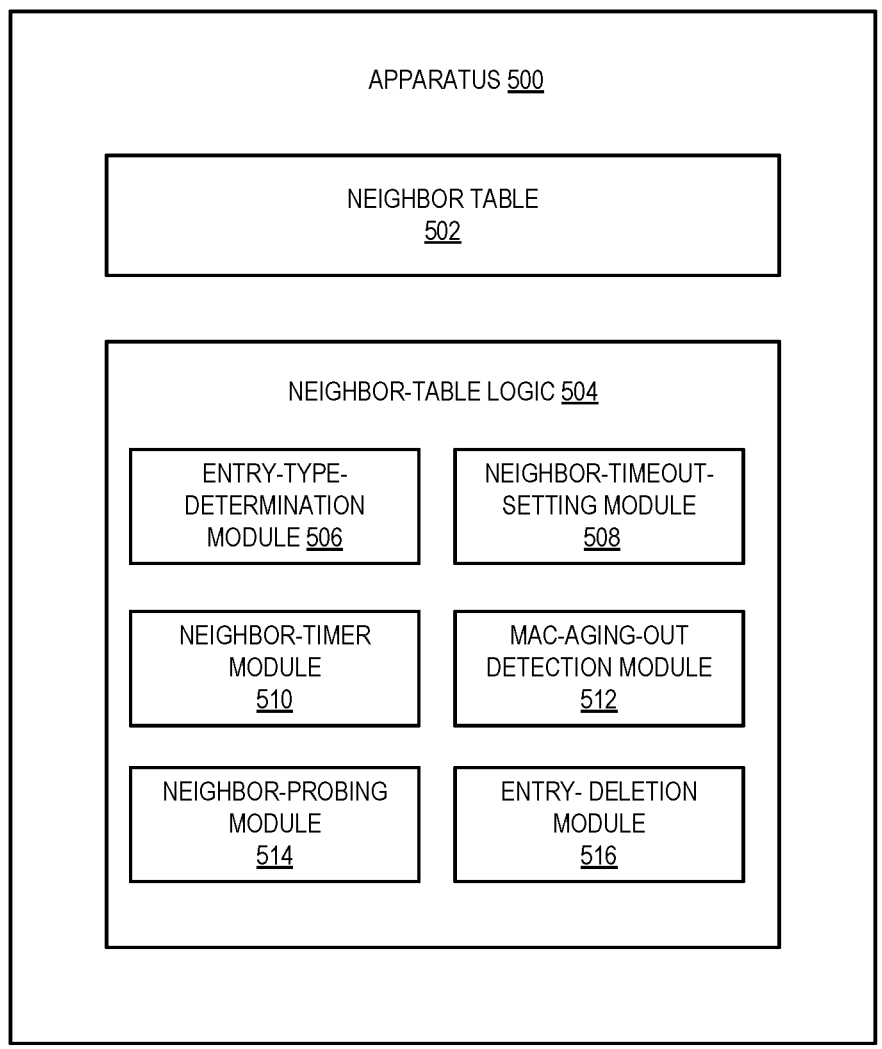
FIG. 5 illustrates an exemplary apparatus that facilitates dynamic neighbor aging, according to one embodiment.

FIG. 5 illustrates an exemplary apparatus that facilitates dynamic neighbor aging, according to one embodiment.

Apparatus 500 can comprise a plurality of units or apparatuses, which may communicate with one another via a wired, wireless, quantum light, or electrical communication channel. Apparatus 500 may be realized using one or more integrated circuits (e.g., ASICs), and may include fewer or more units or apparatuses than those shown in FIG. 5. Furthermore, apparatus 500 may be integrated in a computer system, or realized as a separate device or devices capable of communicating with other computer systems and/or devices. In some embodiments, apparatus 500 can be part of a switching element (e.g., a switch or a router) in a network. Note that the switching element may include additional units or modules, such as transmitting and receiving ports, switching logics, on-switch memory, etc., which are not shown in FIG. 5.

In FIG. 5, apparatus 500 can include a neighbor table 502 and a neighbor-table logic 504. Neighbor table 502 can store information obtained from address resolutions, such as MAC-IP binding. Neighbor table 502 and neighbor-table logic 504 can be implemented using hardware as well as software.

Neighbor-table logic 504 is the control logic for neighbor table 502. Neighbor-table logic 504 can be responsible for entering entries into neighbor table 502 and deleting entries from neighbor table 502. Neighbor-table logic 504 can include an entry-type-determination module 506, a neighbor-timeout-setting module 508, a neighbor-timer module 510, a MAC-aging-out-detection module 512, a neighbor-probing module 514, and an entry-deletion module 516.

Entry-type-determination module 506 can be responsible for determining the type of a learned neighbor entry. More specifically, entry-type-determination module 506 can determine, based on the MAC address or the IP address associated with a neighbor entry, whether the neighbor entry is a secure-host entry or a DHCP-client entry. If the neighbor entry is neither a secure-host entry nor a DHCP-client entry, entry-type-determination module 506 can determine that the neighbor entry is a dynamic-host entry.

Neighbor-timeout-setting module 508 can be responsible for setting up the timeout value of the neighbor entries based on their corresponding type. More specifically, the timeout value of secure-host entries can be set as infinity, the timeout value of DHCP-client entries can be set as the corresponding DHCP lease time, and the timeout value of dynamic-host entries can be set as the default value. Depending on the type of switches, the default value can be different. Moreover, a network administrator can also configure the default value based on the practical need. An exemplary default neighbor timeout value can be 30 minutes or a couple of hours.

Neighbor-timer module 510 can be responsible for tracking the age of the entries in neighbor table 502. Dynamic-host or DHCP-client neighbor entries can expire by aging out. However, a secure-host entry does not age out but can expire when the MAC address is de-authenticated and the corresponding MAC address entry is deleted from the MAC table on the switch. Moreover, it is possible that a DHCP-client entry is invalidated before aging out due to the associated IP address being removed from the DHCP-snooping database.

MAC-aging-out-detection module 512 detects MAC-aging out events associated with a neighbor entry. More specifically, when the MAC entry associated with the MAC address of a particular neighbor entry ages out, MAC-aging-out-detection module 512 receives a control signal sent by the MAC-table logic, indicating the expiration of that MAC entry. Neighbor-probing module 514 can be configured to probe the host in response to MAC-aging-out-detection module 512 detecting the expiration of the corresponding MAC entry. In some embodiments, neighbor-probing module 514 can be configured to transmit an initial unicast probe packet to the host. Neighbor-probing module 514 can be further configured to transmit subsequent broadcast probe packets (e.g., on the corresponding VLAN). Entry-deletion module 516 is configured to delete expired neighbor entries. In the event of host probing, entry-deletion module 516 is configured to delete the corresponding neighbor entry in response to not receiving a reply after a predetermined probes have been transmitted.

Figure 6:
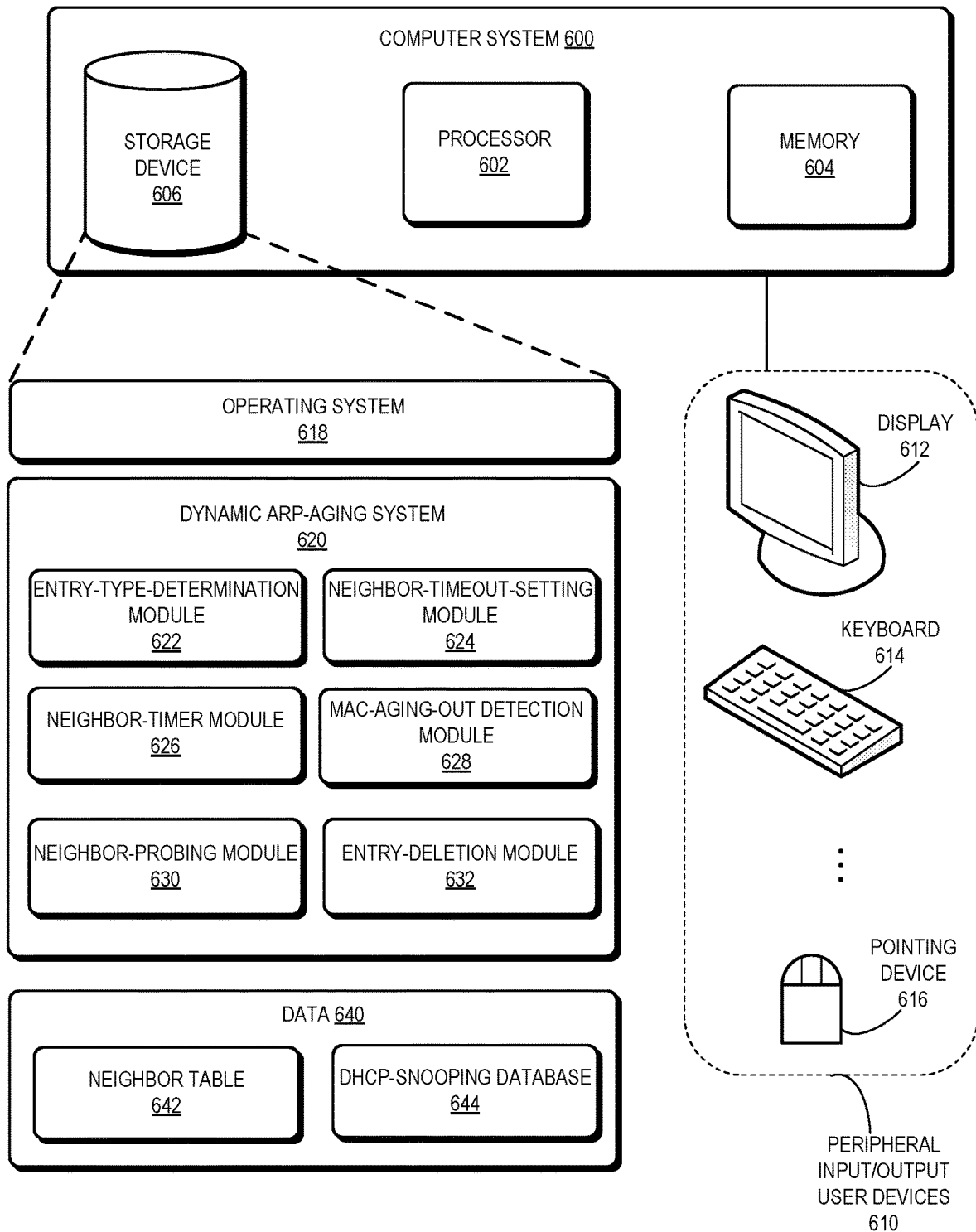
FIG. 6 illustrates an exemplary computer system that facilitates the dynamic tuning of neighbor aging, according to one embodiment.

FIG. 6 illustrates an exemplary computer system that facilitates the dynamic tuning of neighbor aging, according to one embodiment. Computer system 600 includes a processor 602, a memory 604, and a storage device 606. Furthermore, computer system 600 can be coupled to peripheral input/output (I/O) user devices 610, e.g., a display device 612, a keyboard 614, and a pointing device 616. Storage device 606 can store an operating system 618, a dynamic neighbor-aging system 620, and data 640.

Dynamic neighbor-aging system 620 can include instructions, which when executed by computer system 600, can cause computer system 600 or processor 602 to perform methods and/or processes described in this disclosure. Specifically, dynamic neighbor-aging system 620 can include instructions for determining the type of neighbor entries (entry-type-determination module 622), instructions for setting neighbor timeout values (neighbor-timeout-setting module 624), instructions for running neighbor expiration timers (neighbor-timer module 626), instructions for detecting MAC-aging-out of neighbor entries (MAC-aging-out-detection module 628), instructions for adaptively probing neighbors corresponding to expired MAC entries (neighbor-probing module 630), and instructions for deleting expired neighbor entries (entry-deletion module 632). Data 640 can include a neighbor table 642 that stores IP-MAC mappings and a DHCP-snooping database 644.

In general, the disclosed embodiments provide a solution to the problem of excessive consumption of network resources resulting from frequent neighbor entries aging-out in the EVPN setting. To reduce the neighbor aging-out frequency, in some embodiments, entries in the neighbor table can be categorized into different types, with different types of neighbor entries having different timeout values. More particularly, depending on the MAC or IP address, there can be three types of neighbor entries, the secure-host entries, the DHCP-client entries, and the dynamic-host entries. Entries associated with authenticated MAC addresses can be labeled as secure-host entries and can have their neighbor timeout value set as infinity. Entries associated with IP addresses of DHCP clients can be labeled as DHCP-client entries and can have their neighbor timeout value set as the corresponding DHCP lease time. Other entries can be labeled as dynamic-host entries and can have their neighbor timeout value set as the default value. Setting neighbor timeout values according to the entry types can decrease the possibility of valid neighbor entries aging out. To reduce the number of neighbor probe packets transmitted responsive to aged out MAC entries, in some embodiments, a VTEP can be configured to transmit initial neighbor-probe packets in a unicast manner. This approach can significantly reduce the amount of ingress replication of the neighbor-probe packets at peer VTEPs.

One embodiment provides a system and method for managing, at a network node, a data structure indicating neighbor node address information. During operation, the system can determine, based on a media access control (MAC) address or an Internet protocol (IP) address associated with an entry in the data structure, a type of the entry, and set a timeout value for the entry based on the determined type. In response to detecting that an entry corresponding to the MAC address expires in a MAC table maintained by the network node, the system can identify an interface on the network node to which a neighbor associated with the MAC address was previously coupled and transmit a unicast neighbor-probe packet on the identified interface to determine a connection status of the neighbor.

In a variation on this embodiment, determining the type of the entry can include: in response to determining that the MAC address belongs to a secure host authenticated using a MAC-based authentication mechanism, marking the entry as a secure-host entry; in response to determining that the IP address belongs to a dynamic host configuration protocol (DHCP) client, marking the entry as a DHCP-client entry; and in response to determining that the MAC address does not belong to a secure host and the IP address does not belong to a DHCP client, marking the entry as a dynamic-host entry.

In a further variation, setting the timeout value for the entry can include: in response to the entry being marked as a secure-host entry, setting the timeout value as infinity; in response to the entry being marked as a DHCP-client entry, setting the timeout value according to a DHCP lease time associated with the DHCP client; and in response to the entry being marked as a dynamic-host entry, setting the timeout value according to a default value.

In a further variation, in response to determining that the secure host is de-authenticated, the system can delete the secure-host entry.

In a further variation, in response to determining, based on information obtained from a DHCP-snooping database, that the DHCP lease is terminated, the system can delete the DHCP-client entry; in response to determining, based on information obtained from a DHCP-snooping database, that the DHCP lease is renewed, the system can update the timeout value of DHCP-client entry based on the renewed DHCP lease; and in response to determining that a current age of the DHCP-client entry reaches the timeout value, the system can delete the DHCP-client entry.

In a further variation, in response to determining that a current age of the dynamic-host entry reaches the timeout value, the system can delete the dynamic-host entry.

In a variation on this embodiment, the network node is a virtual tunnel end point (VTEP) implementing Ethernet virtual private network (EVPN).

In a variation on this embodiment, in response to receiving a reply to the unicast neighbor-probe packet from the neighbor, the system can refresh the entry in the data structure.

In a further variation, in response to not receiving a reply to the unicast neighbor-probe packet after a predetermined interval, the system can transmit one or more broadcast neighbor-probe packets.

In a further variation, in response to receiving a reply to a broadcast neighbor-probe packet, the system can update the entry in the data structure based on the received reply; and in response to not receiving a reply to a predetermined number of broadcast neighbor-probe packets, the system can delete the entry.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A computer-executed method, comprising:
    determining, based on a media access control (MAC) address or an Internet protocol (IP) address associated with an entry in a data structure indicating neighbor node address information, a type of the entry;
    setting a timeout value for the entry based on the determined type;
    in response to detecting that an entry corresponding to the MAC address expires in a MAC table maintained by the network node, identifying an interface on the network node to which a neighbor associated with the MAC address was previously coupled; and
    transmitting a unicast neighbor-probe packet on the identified interface to determine a connection status of the neighbor.

2. The method of claim 1, wherein determining the type of the entry comprises:
    in response to determining that the MAC address belongs to a secure host authenticated using a MAC-based authentication mechanism, marking the entry as a secure-host entry;
    in response to determining that the IP address belongs to a dynamic host configuration protocol (DHCP) client, marking the entry as a DHCP-client entry; and
    in response to determining that the MAC address does not belong to a secure host and the IP address does not belong to a DHCP client, marking the entry as a dynamic-host entry.

3. The method of claim 2, wherein setting the timeout value for the entry comprises:
    in response to the entry being marked as a secure-host entry, setting the timeout value as infinity;
    in response to the entry being marked as a DHCP-client entry, setting the timeout value according to a DHCP lease time associated with the DHCP client; and
    in response to the entry being marked as a dynamic-host entry, setting the timeout value according to a default value.

4. The method of claim 3, further comprising:
    in response to determining that the secure host is de-authenticated, deleting the secure-host entry.

5. The method of claim 3, further comprising:
    in response to determining, based on information obtained from a DHCP-snooping database, that the DHCP lease is terminated, deleting the DHCP-client entry;
    in response to determining, based on information obtained from a DHCP-snooping database, that the DHCP lease is renewed, updating the timeout value of DHCP-client entry based on the renewed DHCP lease; and in response to determining that a current age of the DHCP-client entry reaches the timeout value, deleting the DHCP-client entry.

6. The method of claim 3, further comprising:

in response to determining that a current age of the dynamic-host entry reaches the timeout value, deleting the dynamic-host entry.

7. The method of claim 1, wherein the network node is a virtual tunnel end point (VTEP) implementing Ethernet virtual private network (EVPN).

8. The method of claim 1, further comprising:

in response to receiving a reply to the unicast neighbor-probe packet from the neighbor, refreshing the entry in the data structure.

9. The method of claim 8, further comprising:

in response to not receiving a reply to the unicast neighbor-probe packet after a predetermined interval, transmitting one or more broadcast neighbor-probe packets.

10. The method of claim 9, further comprising:

in response to receiving a reply to a broadcast neighbor-probe packet, updating the entry in the data structure based on the received reply; and in response to not receiving a reply to a predetermined number of broadcast neighbor-probe packets, deleting the entry.

11. A computer system, comprising:

a processer;

a storage device coupled to the processor and storing instructions, which when executed by the processor cause the processor to perform a method, the method comprising:

determining, based on a media access control (MAC) address or an Internet protocol (IP) address associated with a neighbor entry in a data structure that stores a plurality of neighbor entries indicating neighbor node address information, an entry type;

setting a timeout value for the neighbor entry based on the determined entry type;

in response to detecting that an entry corresponding to the MAC address expires in a MAC table maintained by the network node, identifying an interface on the network node to which a neighbor associated with the MAC address was previously coupled; and transmitting a unicast neighbor-probe packet on the identified interface to determine a connection status of the neighbor.

12. The computer system of claim 11, wherein determining the entry type comprises:

in response to determining that the MAC address belongs to a secure host authenticated using a MAC-based authentication mechanism, marking the neighbor entry as a secure-host entry;

in response to determining that the IP address belong to a dynamic host configuration protocol (DHCP) client, marking the neighbor entry as a DHCP-client entry; and in response to determining that the MAC address does not belong to a secure host and the IP address does not belongs to a DHCP client, marking the neighbor entry as a dynamic-host entry.

13. The computer system of claim 12, wherein setting the timeout value comprises:

in response to the neighbor entry being marked as a secure-host entry, setting the timeout value as infinity;

in response to the neighbor entry being marked as a DHCP-client entry, setting the timeout value according to a DHCP lease time associated with the DHCP client; and in response to the neighbor entry being marked as a dynamic-host entry, setting the timeout value according to a default value.

14. The computer system of claim 13, wherein the method further comprises:

in response to determining that the secure host is de-authenticated, deleting the secure-host entry.

15. The computer system of claim 13, wherein the method further comprises:

in response to determining, based on information obtained from a DHCP-snooping database, that the DHCP lease is terminated, deleting the DHCP-client entry;

in response to determining, based on information obtained from a DHCP-snooping database, that the DHCP lease is renewed, updating the timeout value of DHCP-client entry based on the renewed DHCP lease; and in response to determining that a current age of the DHCP-client entry reaches the timeout value, deleting the DHCP-client entry.

16. The computer system of claim 13, wherein the method further comprises:

in response to determining that a current age of the dynamic-host entry reaches the timeout value, deleting the dynamic-host entry.

17. The computer system of claim 11, wherein the network node is a virtual tunnel end point (VTEP) implementing Ethernet virtual private network (EVPN).

18. The computer system of claim 11, wherein the method further comprises:

in response to receiving a reply to the unicast neighbor-probe packet from the neighbor, refreshing the entry in the data structure.

19. The computer system of claim 18, wherein the method further comprises:

in response to not receiving a reply to the unicast neighbor-probe packet after a predetermined interval, transmitting one or more broadcast neighbor-probe packets.

20. The computer system of claim 19, wherein the method further comprises:

in response to receiving a reply to a broadcast neighbor-probe packet, updating the entry in the data structure based on the received reply; and in response to not receiving a reply to a predetermined number of broadcast neighbor-probe packets, deleting the entry.

* * * * *